(12) United States Patent
Zoller

(10) Patent No.: US 7,108,544 B2
(45) Date of Patent: Sep. 19, 2006

(54) CORD RETAINER

(76) Inventor: Drew Zoller, 309 W. 19th St., Apt. 33, New York, NY (US) 10011

( * ) Notice: Subject to any disclaimer, the term of this patent is extended or adjusted under 35 U.S.C. 154(b) by 0 days.

(21) Appl. No.: 11/223,299

(22) Filed: Sep. 9, 2005

(65) Prior Publication Data

US 2006/0009069 A1   Jan. 12, 2006

Related U.S. Application Data

(63) Continuation-in-part of application No. 10/631,110, filed on Jul. 31, 2003, now Pat. No. 6,957,978.

(51) Int. Cl.
*H01R 13/72* (2006.01)
*H01R 13/56* (2006.01)

(52) U.S. Cl. .................. 439/501; 439/445; 242/400.1; 242/405.1

(58) Field of Classification Search ............. 439/369, 439/501, 470, 445; 242/400.1, 405, 405.1; 379/447
See application file for complete search history.

(56) References Cited

U.S. PATENT DOCUMENTS

| | | |
|---|---|---|
| 1,247,672 A | 11/1917 | Hallberg |
| 2,031,434 A | 2/1936 | Stern et al. |
| 3,373,954 A | 3/1968 | Hilsinger, Jr. |
| 4,585,194 A | 4/1986 | Schwob |
| 5,071,367 A | 12/1991 | Luu |
| 5,138,351 A | 8/1992 | Wiegand et al. |
| 5,156,242 A | 10/1992 | Ditzig |
| 5,388,155 A | 2/1995 | Smith |

(Continued)

FOREIGN PATENT DOCUMENTS

GB   2 351 485 A   1/2001

OTHER PUBLICATIONS

Jabra, entitled "Jabra EarSet WindUp", publication date unknown, but prior to Jun. 23, 2003.

(Continued)

*Primary Examiner*—Briggitte R. Hammond
(74) *Attorney, Agent, or Firm*—Tarolli, Sundheim, Covell & Tummino LLP

(57) ABSTRACT

A cord retainer is utilized in association with a portable electrical device, such as a cellular phone or a portable disc player. The cord retainer includes a base which is connected with the electrical device or with a case for the electrical device. A flange is connected with and extends from the base. The flange and base may cooperate with a surface of a housing of the electrical device or with a surface of the case to at least partially define a groove into which a cord may be manually wound. The cord retainer may be integrally formed as one piece with the housing of the electrical device or with the case. The base of the cord retainer may cooperate with the housing of the electrical device or the case to form an opening through which a belt can be moved.

15 Claims, 6 Drawing Sheets

U.S. PATENT DOCUMENTS

| | | |
|---|---|---|
| 5,819,894 A | 10/1998 | Okamoto |
| 5,939,860 A | 8/1999 | William |
| 5,961,062 A | 10/1999 | Beihl |
| 6,164,582 A | 12/2000 | Vara |
| 6,386,906 B1 | 5/2002 | Burke |
| 6,428,348 B1 | 8/2002 | Bean |
| 6,450,436 B1 * | 9/2002 | Tsuji et al. .............. 242/400.1 |
| 6,484,787 B1 | 11/2002 | Walters |
| 6,536,699 B1 | 3/2003 | Glass |
| 6,550,108 B1 | 4/2003 | Pratl |
| 6,698,560 B1 | 3/2004 | Reardon et al. |
| 6,942,173 B1 * | 9/2005 | Abramov ................. 242/400.1 |
| 2002/0137554 A1 | 9/2002 | Hanna et al. |

OTHER PUBLICATIONS

Technocell, entitled "Boomerang Hands Free Holster", publication date unknown, but prior to Jun. 23, 2003.

Design Picture, Publication date unknown, believed to be prior to Apr. 2003.

"Zipcord Separate Mic & Ear Mobile Phone Headset—FP 910Rs", www.zipcord.net/CMOAmerica/FP910Rs.htm, Publication date unknown, believed to be prior to Jul. 31, 2003.

* cited by examiner

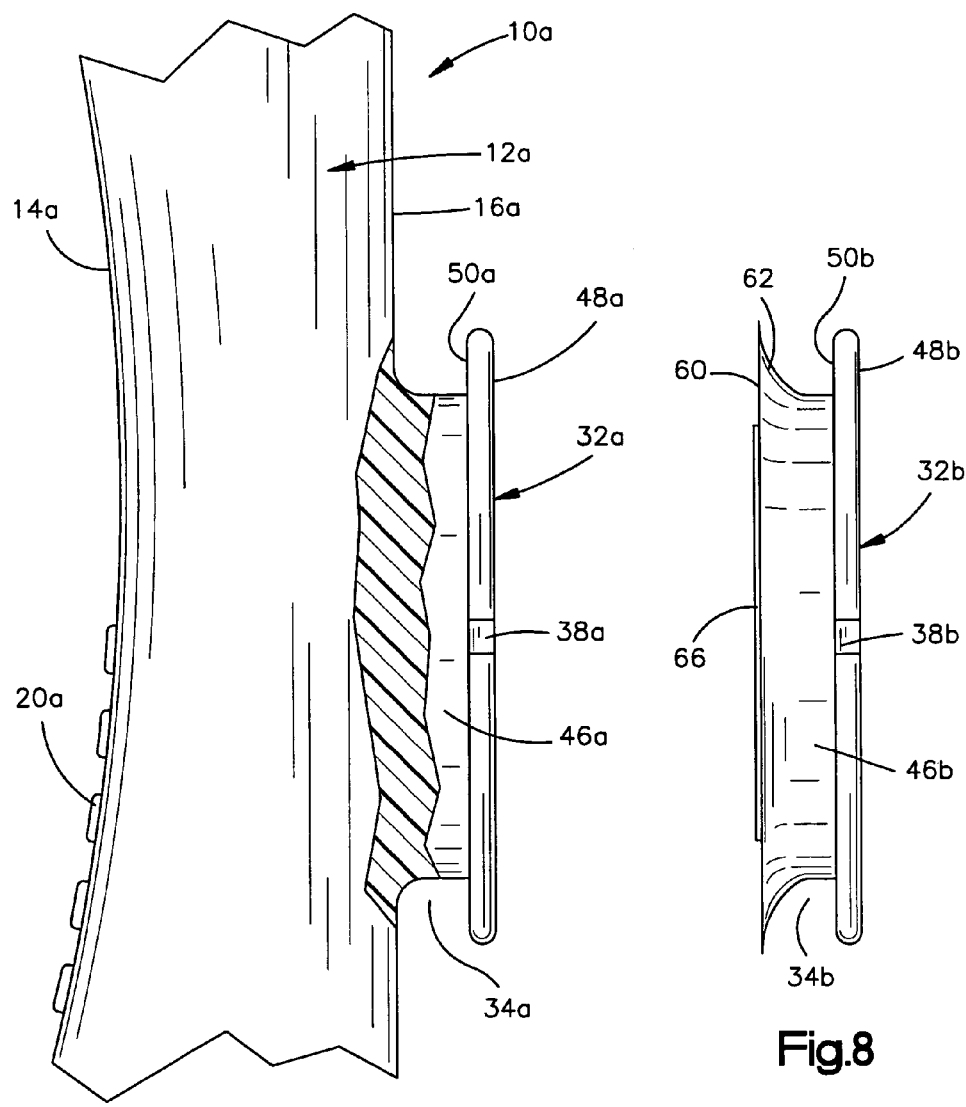

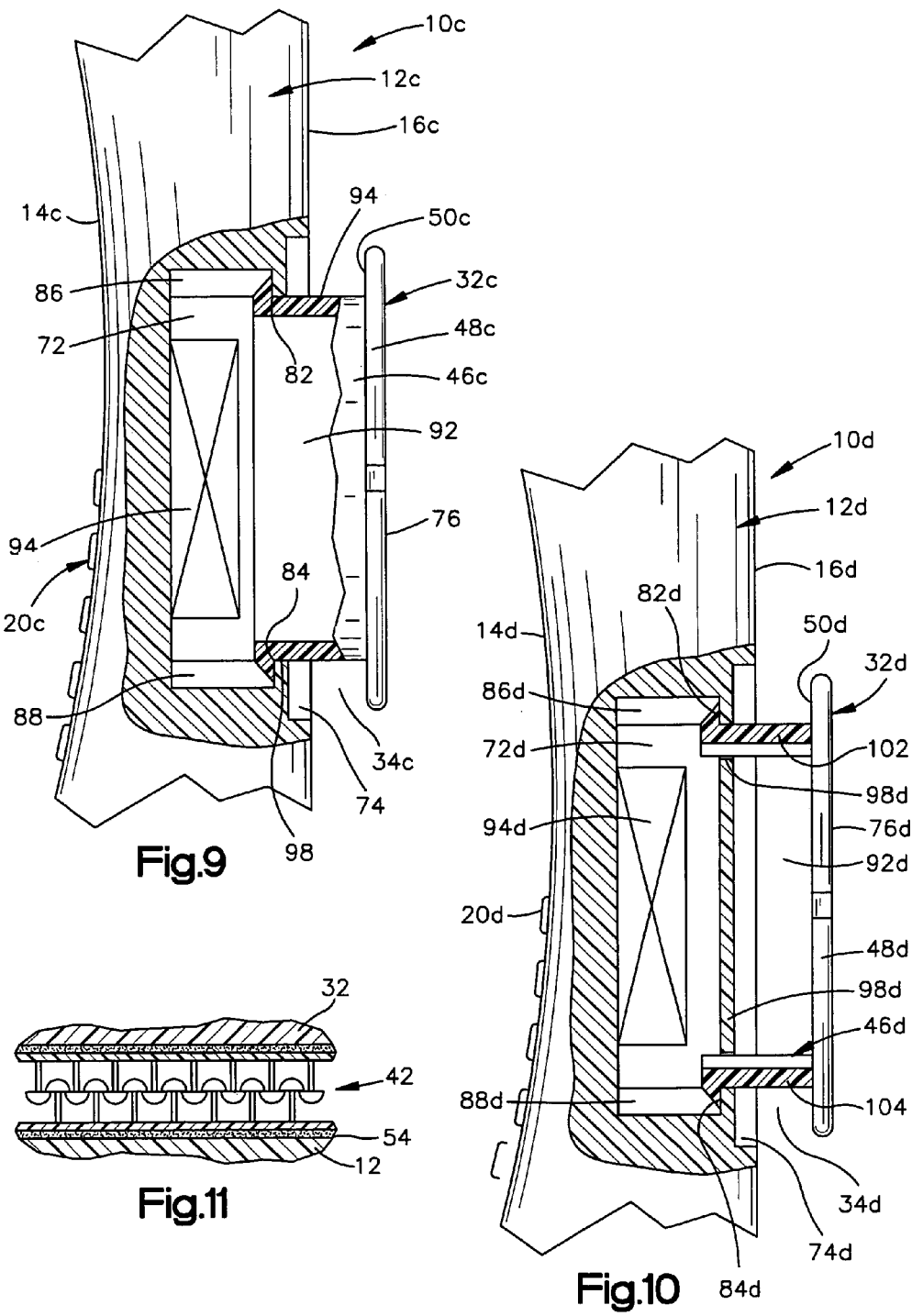

CORD RETAINER

RELATED APPLICATION

This application is a Continuation-In-Part of U.S. patent application Ser. No. 10/631,110 filed Jul. 31, 2003 now U.S. Pat. No. 6,957,978 by Drew Zoller and entitled Cord Retainer. The benefit of the earlier filing date of the aforementioned application Ser. No. 10/631,110 is hereby claimed. The disclosure in the aforementioned application Ser. No. 10/631,110 is hereby incorporated herein in its entirety by this reference thereto.

BACKGROUND OF THE INVENTION

The present invention relates to a new and improved cord retainer which may be utilized in association with a portable electrical device having a cord.

A portable electrical device, that is, a hand held electrical device which is capable of being easily carried and transported, may have a cord which tends to become tangled and/or interfere with movement of the electrical device. It has previously been suggested that cords on portable electrical devices can be held by reel assemblies in the manner disclosed in U.S. Patent Application Publication No. 2002/0137554 A1 and in United Kingdom Published Patent Application No. 2 351 485 A.

When a cord reel, similar to the cord reels in the aforementioned published patent applications, is used in association with a portable electrical device, the cord reel projects from the device. The projecting cord reel is bulky and tends to interfere with the portability of the electrical device. In addition, the projecting cord reel is detrimental to having a compact electrical device which can be readily used.

It has been suggested that a portable electrical device may be enclosed by a case or housing that is provided with a loop. The loop provides a convenient means of securing a headset and cord when they are not in use. A portable electrical device having such a case is disclosed in U.S. Pat. No. 5,388,155.

SUMMARY OF THE INVENTION

The present invention relates to a new and improved cord retainer for use with a portable electrical device having a cord. The electrical device may be at least partially enclosed by a case. The cord retainer is compact and is effective to store a cord without interfering with carrying and use of the electrical device. The cord retainer may have a flange which is connected with a housing of the electrical device or with the case forth the electrical device. The flange of the cord retainer at least partially defines a groove into which the cord may be manually wound.

The cord retainer may be fixedly connected with a housing for the portable electrical device. When a case is used to enclosed at least a portion of the housing for the electrical device, the cord retainer may be fixedly connected to the case. The cord retainer may function as a belt clip to connect the electrical device with a belt.

The cord retainer may be movable between a retracted position in which the cord retainer is at least partially enclosed by the housing for the portable electrical device and an extended position in which the cord retainer extends outward from the housing. The cord retainer may have a recess which receives a component of the portable electrical device.

It is contemplated that a cord retainer constructed in accordance with the present invention will be utilized in association with many different types of portable electrical devices. The cord retainer may be particularly advantageous when utilized in association with a cellular phone. However, it should be understood that the cord retainer may be utilized in association with other portable electrical devices, such as disc players, digital music players, and/or radios.

BRIEF DESCRIPTION OF THE DRAWINGS

The foregoing and other features of the present invention will become more apparent upon a consideration of the following description taken in connection with the accompanying drawings wherein:

FIG. 7 is a fragmentary schematic pictorial illustration depicting the manner in which the cord retainer of FIGS. 4–6 may be integrally formed as one piece with the electrical device of FIGS. 1–3;

FIG. 8 is a schematic side elevational view of an embodiment of a cord retainer having inner and outer flanges;

FIG. 9 is a fragmentary schematic pictorial illustration depicting the manner in which the cord retainer may be mounted for movement between extended and retracted positions;

FIG. 10 is a fragmentary schematic pictorial illustration, generally similar to FIG. 9, of another embodiment of the cord retainer;

FIG. 11 is a schematic illustration of a reclosable fastener;

DESCRIPTION OF SPECIFIC PREFERRED EMBODIMENTS OF THE INVENTION

Figure 1:
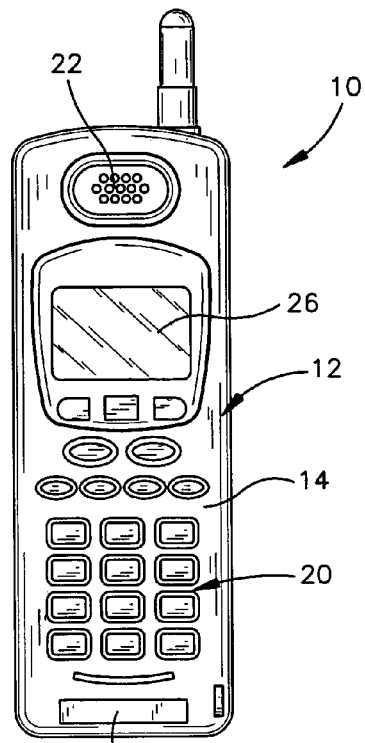
FIG. 1 is a schematic front plan view of a portable electrical device.

A known portable electrical device 10 is illustrated in FIG. 1. Although the portable electrical device 10 is a cellular phone, it should be understood that the cellular phone is representative of many different known types of portable electrical devices. For example, the portable electrical device may be a disc player, digital music player, or radio.

Figure 2:
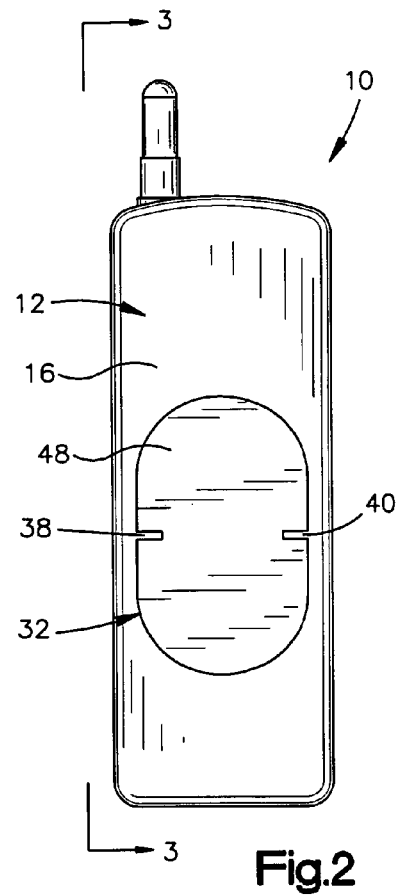
FIG. 2 is a schematic rear plan view of the portable electrical device of FIG. 1 and illustrating the manner in which a cord retainer constructed in accordance with the present invention is connected with the electrical device.
Figure 3:
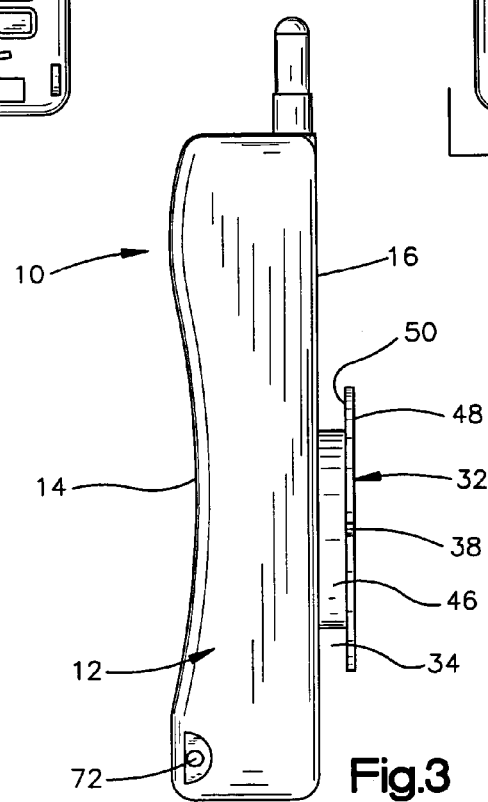
FIG. 3 is a schematic side elevational view, taken generally along the line 3—3 of FIG. 2, further illustrating the relationship between the cord retainer and the electrical device.

The cellular phone 10 includes a housing 12 having a front side 14 and a rear side 16 (FIGS. 2 and 3). A key pad 20, speaker 22, microphone 24 and display 26 (FIG. 1) are disposed on the front side 14 of the housing 12. It should be understood that the cellular phone 10 may have any one of many known constructions. The specific cellular telephone 10 illustrated in FIGS. 1–3 is merely representative of many different known cellular telephones.

A cord retainer 32 (FIGS. 2 and 3), constructed in accordance with the present invention, is mounted on the rear side 16 of the housing 12. The cord retainer 32 is integrally formed of a single piece of molded polymeric material. However, if desired the cord retainer 32 could be formed of a plurality of pieces of polymeric material or of another material, such as metal.

The cord retainer 32 at least partially defines a groove 34 (FIG. 3) into which a cord may be manually wound to store the cord. The cord may have any one of many known constructions. For example, the cord may be similar to the cord disclosed in U.S. Patent Application Publication No. 2002/0137554 A1.

A first end of the cord may be connected with an outlet on the portable electrical device 10 or inserted into a notch or recess 38 (FIG. 2) in the cord retainer 32. The cord is manually grasped and wound around the cord retainer 32. As this occurs, a plurality of turns are formed in the cord around the cord retainer 32 to at least partially fill the groove 34 with the electrical cord. The cord retainer 32 does not move relative to the housing 12 as the cord is wound around the cord retainer. The second end of the cord may then be secured by inserting it into a second notch or recess 40 in the cord retainer 32. The stored cord and cord retainer 32 projects for a relatively small distance from the housing 12 and does not destroy the compact construction and portability of the cellular phone 10.

In the specific embodiment of the cord retainer 32 illustrated in FIGS. 2 and 3, there are two notches 38 and 40 in the cord retainer. However, a greater or lesser number of notches may be provided if desired. For example, four notches or recesses, having the same configuration as the notches 38 and 40, may be formed in the cord retainer 32. This would enable the portion of the free end of the cord to be relatively close to a notch into which the cord is inserted. Of course, an even greater number of notches may be provided in the cord retainer 32 if desired.

It is contemplated that the notches 38 and 40 may be omitted and the cord secured to the cord retainer 32 only by winding the cord in the groove 34. If desired, the groove 34 may be provided with a partially restricted entrance to retard movement of the cord from the groove. If the notches 38 and 40 are omitted, clips may be used to further hold the cord in the groove 34. These clips may be connected with the cord retainer 32 or may be separate from the cord retainer.

The cord retainer 32 is fixedly connected with the housing 12. A releasable fastener 42 (FIG. 11), specifically "dual lock" (trademark) reclosable fastener 42, is utilized to fixedly connect the cord retainer 32 with the housing 12. "Dual lock" (trademark) reclosable fastener is commercially available from Minnesota Mining and Manufacturing Company (aka 3M) of Saint Paul, Minn. "Dual lock" (trademark) reclosable fastener has been described as polypropylene reclosable fastener which includes a rubber based pressure sensitive adhesive with 170 to 400 stems per square inch, black foam adhesive, and white polyethylene film liner. The fastener may be black and/or clear.

Other known types of fasteners may be utilized to fixedly connect the cord retainer 32 with the housing 12. For example, one or more screws or similar type fastener may be utilized. Alternatively, a single layer of adhesive may be utilized to connect the cord retainer 32 with the housing 12. If desired, a hook and loop type fastener, such as "velcro" (trademark), may be used to fixedly connect the cord retainer 32 to the housing 12. Regardless of what type of fastener is used, the cord retainer 32 is held in a stationary relationship with the housing 12 by the fastener.

When a releasable fastener, such as "dual lock" (trademark) or "Velcro" (trademark), is utilized to fixedly connect the cord retainer 32 to the housing 12, the cord retainer may be easily disconnected from the housing. This enables an individual using the portable electrical device 10 to easily disconnect the cord retainer 32 from the housing 12. Once the cord retainer 32 has been disconnected from the housing 12, the use of a releasable fastener enables the cord retainer 32 to be easily reconnected to the housing.

The cord retainer 32 has an oval configuration. However, if desired, the cord retainer 32 may have a different configuration, such as a circular configuration. It is believed that the illustrated oval configuration of the cord retainer 32 may be preferred. This is because the oval configuration of the cord retainer 32 tends to maximize the length of the oval groove 34. This tends to maximize the length of cord which will be disposed in each turn of the cord around the cord retainer 32.

If the cord retainer 32 is constructed with a circular configuration, the length or circumference of the annular groove may be less than the length of the oval groove 34. Therefore, more turns of the cord would have to be made around the cord retainer in order to store the cord in the groove 34. However, if the housing 12 has a square configuration, rather than the illustrated rectangular configuration, it may be preferred to utilize a cord retainer 32 having a circular configuration.

Cord Retainer

Figure 4:
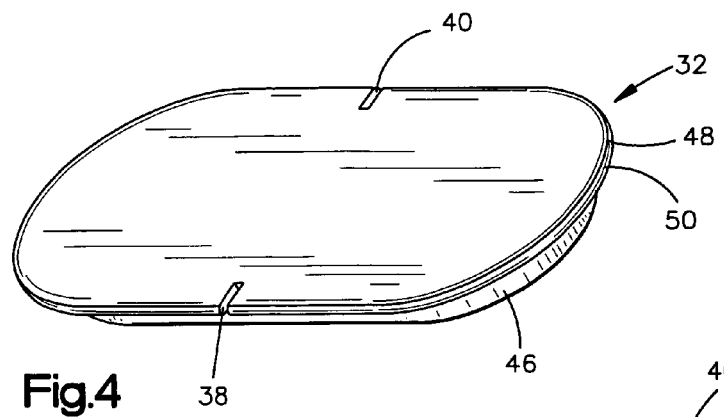
FIG. 4 is an enlarged top pictorial illustration of the cord retainer of FIGS. 2 and 3.
Figure 5:
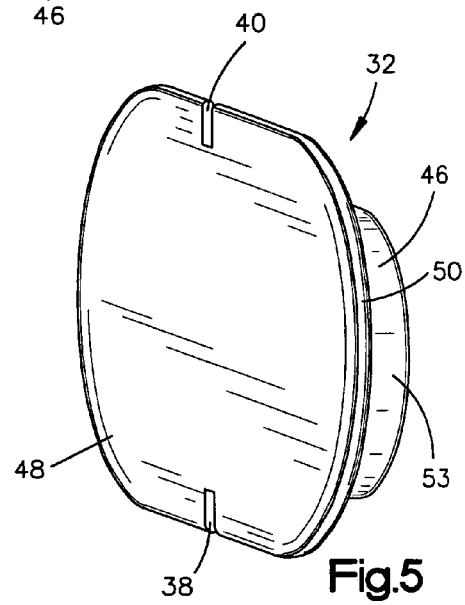
FIG. 5 is a side pictorial illustration of the cord retainer of FIGS. 2 and 3.
Figure 6:
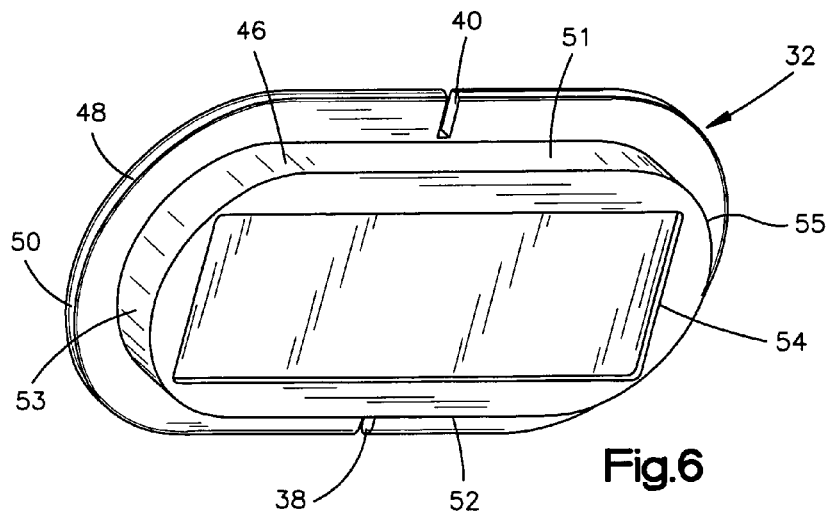
FIG. 6 is a bottom pictorial illustration of the cord retainer of FIGS. 2 and 3.

The construction of the cord retainer 32 is illustrated in FIGS. 4 through 6. The cord retainer 32 is integrally formed as one piece of molded polymeric material. The cord retainer 32 includes a base portion 46 and a plate portion 48 (FIGS. 4–6). If desired, the base portion 46 and plate portion 48 may be formed separately and interconnected with one or more fasteners.

The base portion 46 and plate portion 48 both have an oval configuration. However, the plate portion 48 extends beyond the base portion 46 to form a flange 50. As is perhaps best seen in FIG. 3, the flange 50 has an inner side surface which cooperates with the rear side 16 of the housing 12 and the base portion 46 to form the groove 34.

Since the plate portion 48 has an oval configuration which corresponds to the oval configuration of the base portion 46, the flange 50 extends outward from the base portion 46 by substantially the same distance throughout the extent of the flange. This results in the groove 34 (FIG. 3) having the same depth throughout its extent. Therefore, turns of the cord which are wrapped around the base portion 46 can be firmly gripped between the flange 50 and the rear side 16 of the housing 12 throughout the extent of the groove 34.

The oval base portion 46 has parallel side surfaces 51 and 52 (FIG. 6). The side surfaces 51 and 52 are interconnected by arcuate end surfaces 53 and 55. The flange 50 has the same configuration as the base portion 46. When the cord is wrapped around the cord retainer 32, turns of the cord are pressed against the side surfaces 51 and 52 and the end surfaces 53 and 55 on the base portion 46. In addition, turns of the cord engage the inner side of the flange 50 and the rear side 16 of the housing 12. The cord retainer 32 is stationary relative to the housing 12 as the cord is manually wound around the cord retainer.

A recess 54 (FIG. 6) is formed in the base portion 46 to receive a fastener formed by a strip of material. The fastener may include a first strip of adhesive which bonds or secures to the flat inner side surface of the recess 54. The fastener may have a second or outer strip of adhesive. A removable covering strip may be provided on the second or outer strip of adhesive to prevent it from bonding to objects other than the rear side 16 of the housing 12. If a reclosable fastener, such as "dual lock" (trademark) is utilized, a portion of the reclosable fastener would be positioned in the recess 54.

The depth of the recess 54 will depend upon the thickness of the fastener utilized. If a single layer of adhesive is used as the fastener, the recess 54 will be shallow. If a multiple layered fastener, such as "dual lock" (trademark) or "velcro" (trademark), is utilized, the recess 54 will be relatively deep.

If a fastener which is not formed as a strip is utilized, the recess 54 may be eliminated. Thus, if screws or similar devices are utilized to attach the cord retainer 32 to the housing 12, the recess 54 may be omitted. Alternatively, a screw type fastener and adhesive may both be utilized to connect the cord retainer 32 with the housing 12. If this is done, the recess 54 would be provided to receive the adhesive.

Integral Retainer and Housing

In the embodiment of the invention illustrated in FIGS. 1–6, the cord retainer 32 is integrally formed as one piece which is separate from the housing 12. However, in the embodiment of the invention illustrated in FIG. 7, the cord retainer is integrally formed as one piece with the housing. Since components of the embodiment of the invention illustrated in FIG. 7 are similar to components of the embodiment of the invention illustrated in FIGS. 1–6, similar numerals will be utilized to designate similar components. The suffix letter "a" being added to the numerals of FIG. 7 to avoid confusion.

A portable electrical device 10*a* (FIG. 7) includes a housing 12*a* having a front side 14*a* and a rear side 16*a*. In the embodiment of the invention illustrated in FIG. 7, the portable electrical device is a cellular telephone. Therefore, a keypad 20*a* is disposed on the front side 14*a* of the housing 12*a*. It should be understood that the portable electrical device may be a device other than a cellular phone.

A cord retainer 32*a* includes a base portion 46*a* and a plate portion 48*a*. The plate portion 48*a* extends outward from the base portion 46*a* to form a flange 50*a*. The flange 50*a* cooperates with the rear side 16*a* of the housing 12*a* to form a groove 34*a* into which a cord may be manually wound.

In accordance with a feature of this embodiment of the invention, the cord retainer 32*a* is integrally formed as one piece with the housing 12*a*. Thus, the cord retainer 32*a* and housing 12*a* are integrally molded as one piece of polymeric material. Although the cord retainer 32*a* is formed as one piece with the housing 12*a*, it should be understood that the cord retainer 32*a* has the same configuration as the cord retainer 32 of FIGS. 4–6. Of course, there is no recess, corresponding to the recess 54 of FIG. 6, in the base portion 46*a* of the cord retainer 32*a* of FIG. 7.

The base 46*a* of the cord retainer 32*a* is solid. However, the base of the cord retainer may be hollow. If the base 46*a* of the cord retainer 46*a* is hollow, an opening may be provided in the housing 12*a* to enable components of the portable electrical device 10*a* to be disposed in a cavity in the cord retainer.

Cord Retainer-Two Flanges

In the embodiments of the invention illustrated in FIGS. 1–7, the cord retainer 32 has a single flange 50 which cooperates with the rear side 16 of the housing 12 to form the groove 34. In the embodiment of the invention illustrated in FIG. 8, the cord retainer is provided with two flanges which at least partially define a groove in which the cord is received. Since the embodiment of the invention illustrated in FIG. 8 is generally similar to the embodiments of the invention illustrated in FIGS. 1–7, similar numerals will be utilized to identify similar components, the suffix letter "b" being added to the numerals associated with FIG. 8 in order to avoid confusion.

A cord retainer 32*b* (FIG. 8) includes a base portion 46*b* and an outer plate portion 48*b*. The outer plate portion 48*b* extends outward from the base portion 46*b* to form a flange 50*b*. The base portion 46*b* and plate portion 48*b* have the same configuration as the base portion 46 and plate portion 48 of the embodiment of the invention illustrated in FIGS. 4–6. A notch or recess 38*b* for receiving an end portion of a cord is provided in the plate portion 48*b*.

In accordance with a feature of the embodiment of the invention illustrated in FIG. 8, the cord retainer 32*b* includes a second plate portion 60. The plate portion 60 extends outward from the base portion 46*b* to form a second flange 62. The plate portion 60 extends generally parallel to the plate portion 48*b*. Therefore, the flanges 62 and 50*b* extend generally parallel to each other. However, the inner flange 62 is tapered to form a smooth junction with a housing on a portable electrical device.

The plate portions 48*b* and 60 of the cord retainer 32*b* are integrally formed as one piece with the base portion 46*b*. Thus, the base portion 46*b*, plate portion 48*b* and plate portion 60 are formed as a single piece of molded polymeric material. However, if desired either or both of the plate portions 48*b* and 60 may be formed separately from the base portion 46*b*.

A fastener 66 is disposed in a recess formed in the flange 60. The fastener 66 is formed by a strip of material. The illustrated fastener 66 is a reclosable fastener, specifically, "dual lock" (trademark). However, the fastener 66 may have a different construction if desired. For example, the fastener 66 may be formed of a suitable adhesive. If the fastener 66 is formed of adhesive, a releasable cover strip may be provided on the outside of the adhesive. The fastener 66 holds the cord retainer 32*a* against movement relative to a housing of a portable electrical device.

By forming the cord retainer 32*b* with a pair of flanges 50*b* and 62, the groove 34*b* is formed between the flanges. When the cord is manually wound in the groove 34*b*, little or no force is applied by the cord against the housing of the portable electrical device to which the cord retainer 32*b* is fixedly connected. Therefore, there is little or no force tending to loosen the connection formed between the cord retainer 32*b* and the housing of the portable or electrical device by the fastener 66.

Operation

When the cord retainer 32 is to be connected with a housing 12 of an electrical device 10, a protective covering layer is removed from a fastener disposed in the recess 54 in the base of the cord retainer 32. The cord retainer 32 is then fixedly secured to the rear side 16 of the housing 12 of the portable electrical device 10. The connection between the cord retainer 32 and the rear side 16 of the housing 12 holds the cord retainer against movement relative to the housing.

When a cord associated with the cellular telephone 10 is to be stored in the groove 34, the cord may be disconnected from or left in engagement with an outlet 72 (FIG. 3) formed in the portable electrical device 10. If the cord remains in engagement with the outlet 72, the free portion of the cord is wrapped around the base 46 of the cord retainer 32. The portion of the cord adjacent to the free end of the cord is then inserted into the notch or groove 38 or 40.

Regardless of whether or not the cord retainer 32 is formed separately from the housing 12 or is integrally formed as one piece with the housing, the cord retainer is relatively compact. This is because the base portion 46 of the cord retainer projects a relatively small distance outward from the rear side 16 of the housing 12. Due to the oval configuration of the cord retainer, a relatively long length of the cord is wound around the base portion of the cord retainer with each turn of the cord in the groove 34. Therefore, the cord can be easily wound around the stationary cord retainer 32 by manually winding a plurality of turns of the cord around the base portion 46 of the cord retainer.

The cord which is stored with the cord retainer 32 may be for any one of many desired purposes. For example, an earplug may be disposed at one end portion of the cord and the opposite end portion may have a jack for an outlet 72. Of course, the cord can be for other purposes if desired. The cord may be disconnected from the outlet 72 before being wound around the cord retainer 32. Alternatively, the cord may be wound around the retainer 32 while the cord is still connected to the outlet 72.

Although the cord retainer 32 has been described herein in association with a specific portable electrical device 10, that is, in association with a cellular phone, it is contemplated that the cord retainer may be utilized with other types of portable electrical devices. For example, the cord retainer 32 may be associated with a portable disc player, digital music player, or with a radio.

Movable Cord Retainer

In the embodiment of the invention illustrated in FIGS. 1–6, the cord retainer 32 is fixedly connected to the portable electrical device 10. In the embodiment of the invention illustrated in FIG. 9, the cord retainer is movable relative to the portable electrical device. Since the embodiment of the invention illustrated in FIG. 9 is generally similar to the embodiments of the invention illustrated in FIGS. 1–8, similar numerals will be utilized to designate similar components, the suffix letter "c" being associated with the numerals of FIG. 9 to avoid confusion.

A portable electrical device 10c (FIG. 9) includes a housing 12c having a front side 14c and rear side 16c. In the embodiment of the invention illustrated in FIG. 9, the portable electrical device 10c is a cellular telephone. Therefore, a keypad 20c is disposed on the front side 14c of the housing 12c. It should be understood that the portable electrical device may be a device other than a cellular telephone.

A cord retainer 32c includes a base portion 46c and a plate portion 48c. The plate portion 48c extends outward from the base portion 46c to form a flange 50c. The flange 50c cooperates with the rear side 16c of the housing 12c to form a groove 34c into which a cord may be manually wound. The cord retainer 32c is integrally formed as one piece of molded polymeric material. However, the cord retainer 32c may be formed as a plurality of interconnected pieces if desired.

In accordance with a feature of this embodiment of the invention, the cord retainer 32c is movable relative to the housing 12c. The cord retainer 32c is illustrated in FIG. 9 in an extended position relative to the housing 12c. When the cord has been removed from the groove 34c, the cord retainer 32c may be manually moved to the left (as viewed in FIG. 9) relative to the housing 12c. This results in the base 46c of the cord retainer 32c moving into a cavity 72 formed in the portable electrical device 10c.

As the base 46c moves into the cavity 72, the plate portion 48c moves into a recess 74 formed in the rear side 16c of the housing 12c. The recess 74 has a configuration which corresponds to the configuration of the plate portion 48c. Therefore, when the cord retainer 32c has been moved from the extended position illustrated in FIG. 9 to its retracted position, an outer surface 76 on the plate portion 48c is aligned with the outer side surface of the rear side 16c of the housing 12c. This results in the retracted cord retainer 32c being flush with the exterior of the housing 12c to thereby minimize the overall size of the portable electrical device 10c.

When the cord retainer 32c is to be pulled from its retracted position back to its extended position, a tab (not shown) on the plate portion 48c may be manually grasped and the cord retainer pulled outward toward the extended position. Rather than providing a tab on the flange portion 48c, a manually engagable recess may be provided on the flange portion 48c to enable an individual utilizing the portable electrical device 10c to pull the cord retainer 32c outward from the housing 12d. Alternatively, a manually engagable D-ring may be pivotally mounted on the plate portion 48d.

As the cord retainer 32c is pulled outward from the retracted position toward the extended position, retainer tabs 82 and 84 on the base 46c of the cord retainer 32c slide along linear grooves 86 and 88 formed in the housing 12c. When the cord retainer 32c reaches the extended position illustrated in FIG. 9, the retainer tabs 82 and 84 engage stop surfaces formed on the housing 12c to limit outward movement of the cord retainer 32c.

In accordance with another feature of the embodiment of the invention illustrated in FIG. 9, the base 46c of the cord retainer 32c is hollow. This results in the base 46c of the cord retainer 32c having a recess or cavity 92 which may receive a component 94 of the portable electrical device 10c when the cord retainer 32c is in its retracted position. To form the recess 92, the base 46c of the cord retainer 32c has a side wall 94 with an oval cross sectional configuration as viewed in a plane extending parallel to the plate portion 46c. The oval configuration of the side wall 94 corresponds to the oval configuration of the plate portion 48c. The oval configuration of the plate portion 48c is the same as the oval configuration of the plate portion 48 of FIGS. 2–6.

Since the side wall 94 has an oval configuration, as viewed on a plane extending parallel to the flange portion 48c, the recess 92 also has an oval configuration. If desired, the component 94 of the portable electrical device 10c may have an oval configuration which corresponds to the oval configuration of the recess 92. It should be understood that the cord retainer 32c may have a configuration other than the illustrated oval configuration. For example, the cord retainer 32c may have a circular configuration.

It should be understood that the component 94 of the electrical device 10c has been illustrated schematically in FIG. 9 and may be any one of many different components of the portable electrical device 10c. For example, the component 94 may be a battery. Alternatively, the component 94 may include a printed circuit board on which a plurality of solid state devices are mounted. Of course, other components of the portable electrical device 10c may be positioned in the cavity 72.

When the cord retainer 32c is in the retracted position with the plate portion 48c disposed in the recess 74, the component 94 is disposed in the recess 92 in the cord retainer 32c. Thus, when the cord retainer 32c is in the retracted position, the side wall 94 of the cord retainer 32c extends around the component 94. By having the component 94 disposed in the cord retainer 32c when the cord retainer is in the retracted position, the compact construction of the portable electrical device 10c is maintained even though cord retainer 32c has moved into the housing 12c when the cord retainer is in the retracted position.

When a cord is to be manually wound around the cord retainer 32c, the cord retainer is moved from the retracted position to the extended position illustrated in FIG. 9. As the cord retainer 32c moves from the retracted position to the extended position, the retaining tabs 82 and 84 slide along the linear grooves 86 and 88 to guide movement of the cord retainer 32c. In addition, the sidewall 94 engages a side surface 98 of an opening in the housing 12c to further guide the movement of the cord retainer 32c. Therefore, the cord retainer 32c is moved along a straight path from the retracted position to the extended position.

As the cord retainer 32c moves to the extended position, the side wall 94 of the cord retainer is moved toward the right (as viewed in FIG. 9) relative to the component 94 of the portable electrical device 10c. In the illustrated embodiment of the invention, the component 94 is fixedly connected with the housing 12c and does not move outward with the cord retainer 32c. However, if desired, the component 94 may be connected with the cord retainer 32c so that the component remains in the recess 92 in the cord retainer 32c as the cord retainer is moved from the retracted position to the extended position. Of course, a portion of the component 94 may be mounted in the recess 92 for movement with the cord retainer 32c and another portion of the component 94 may be connected with the housing 12c and remain stationary relative to the housing as the cord retainer 32c is pulled outward to the extended position of FIG. 9.

Once the cord retainer 32c is moved to the extended position of FIG. 9, a cord may be manually wound around the cord retainer in the manner previously explained in conjunction with the embodiments of the invention illustrated in FIGS. 1–8. As the cord is wound around the extended cord retainer 32c, a portion of one or more turns of the cord move into the recess 74 as the cord is wrapped around the side wall 94. In addition, the turns of the cord press against the flange 50c. The turns of the cord are held between the plate portion 48c of the cord retainer 32 and the rear side surface 16c which partially defines the recess 74. As the cord is manually wound around the side wall 94 of the cord retainer 32c, the cord retainer is stationary relative to the housing 12c.

Movable Cord Retainer

Second Embodiment

In the embodiment of the cord retainer illustrated in FIG. 9, the base portion 46c of the cord retainer 32c includes a continuous oval side wall 94. In the embodiment of the invention illustrated in FIG. 10, the continuous oval side wall is eliminated and the base is formed by a plurality of support sections or legs. Since the embodiment of the invention illustrated in FIG. 10 is generally similar to the embodiments of the invention illustrated in FIGS. 1–9, similar numerals will be utilized to designate similar components, the suffix letter "d" being associated with the numerals of FIG. 10 to avoid confusion.

A portable electrical device 10d (FIG. 10) includes a housing 12d having a front side 14d and a rear side 16d. In the embodiment of the invention illustrated in FIG. 10, the portable electrical device 10d is a cellular telephone. Therefore, a keypad 20d is disposed on the front side 14d of the housing 12d. It should be understood that the portable electrical device 10d may be a device other than a cellular telephone. For example, the portable electrical device 10d may be a compact disc player or a radio.

The cord retainer 32d includes a base portion 46d and a plate portion 48d. The plate portion 48d extends outward from the base portion 46d to form a flange 50d. The flange 50d cooperates with the rear side 16d of the housing 12d to form a groove 34d into which a cord may be manually wound. The cord retainer 32d is integrally formed as one piece of molded polymeric material. However, the cord retainer 32d may be formed as a plurality of interconnected pieces if desired.

In accordance with a feature of this embodiment of the invention, the cord retainer 32d is movable relative to the housing 12d. The cord retainer 32d is illustrated in FIG. 10 in an extended position relative to the housing 12d. When the cord has been removed from the groove 34d, the cord retainer 32d may be manually moved to the left (as viewed in FIG. 10) relative to the housing 12d. This results in the base 46d of the cord retainer 32d moving into a cavity 72d formed in the portable electrical device 10d.

As the base 46d moves into the cavity 72d, the plate portion 48d moves into a recess 74d in the rear side 16d of the housing 12d. The recess 74d has a configuration which corresponds to the configuration of the plate portion 48d. Therefore, when the cord retainer 32d has been moved from the extended position illustrated in FIG. 10 to its retracted position, an outer surface 76d on the plate portion 78d is aligned with the outer surface of the rear side 16d of the housing 12d. This results in the retracted cord retainer 32d being flush with the exterior of the housing 12d thereby minimizing the overall size of the portable electrical device 10d.

When the cord retainer 32d is to be pulled from its retracted position back to its extended position, a tab (not shown) on the plate portion 48d may be manually grasped and the cord retainer pulled outward toward the extended position. Rather than pulling a tab on the flange portion 48d, a manually engagable recess may be provided in the flange portion to enable an individual utilizing the portable electrical device 10d to pull the cord retainer 32d outward from the housing 12d. Alternatively, a manually engagable D-ring may be pivotally mounted on the plate portion 48d.

As the cord retainer 32d is pulled outward from the retracted position toward the extended position, retainer tabs 82d and 84d on the base 46d of the cord retainer 32d slide along linear grooves 86d and 88d formed in the housing 12d. When the cord retainer 32d reaches the extended position illustrated in FIG. 9, the retainer tabs 82d and 84d engage stop surfaces formed on the housing 12d to limit outward movement of the cord retainer 32d.

In accordance with a feature of the embodiment of the invention illustrated in FIG. 10, the base 46d of the cord retainer 32d is formed by a pair of support sections or legs 102 and 104. This results in the base 46d of the cord retainer 32d having a recess 92d which may receive a component 94d of the electrical device 10d when the cord retainer is in its retracted position. In the illustrated embodiment of the invention, the support sections 102 and 104 are arcuate panels having a configuration corresponding to the configuration of the arcuate end surfaces 53 and 55 of the cord retainer 32 of FIG. 6. It should be understood that the cord retainer 32d may have a configuration other than the illustrated oval configuration. For example, the cord retainer 32d may have a circular configuration.

The relatively small extent of the support sections 102 and 104, compared to the extent of the side wall 94 of FIG. 9, enables the cord retainer 32d to be moved to the retracted position with the cord retainer in a minimum of space in the cavity 72d. This maximizes the space available for the component 94d of the electrical device 10d. As was previously mentioned, the component 94d may be a battery and/or printed circuit board with a solid state electronic devices thereon. Of course, other components of the portable electric device 10d may be positioned in the cavity 72d.

When the cord retainer 32d is in the retracted position with a plate portion 48d disposed in the recess 74d, the component 94d is disposed between the support sections 102 and 104 of the cord retainer 32d. Thus, when the cord retainer 32d is in the retracted position, the support sections 102 and 104 of the cord retainer are disposed in the cavity 72d adjacent to opposite ends of the component 94d. By constructing the base portion 46d of the cord retainer 32d with the pair of spaced apart support sections 102 and 104, the available space in the cavity 72d for the component 94d tends to be maximized and the compact construction of portable electrical device 10d is facilitated.

When a cord is to be manually wound around the cord retainer 32d, the cord retainer is moved from the retracted position, to the extended position illustrated in FIG. 10. As the cord retainer 32d moves from the retracted position to the extended position, the retainer tabs 82d and 84d slide along the linear grooves 86d and 88d to guide movement of the cord retainer 32d. In addition, the support sections 102 and 104 engage side surfaces 98d of openings in the housing 12d to further guide movement of the cord retainer 32d. Therefore, the cord retainer 32d is moved along a straight path from the retracted position to the extended position.

As the cord retainer 32d moves to the extended position, the plate portion 48d and support sections 102 and 104 of the cord retainer are moved toward the right (as viewed in FIG. 10) relative to the component 94 of the portable electrical device 10d. Once the cord retainer 32d is moved to the extended position of FIG. 10, the cord may be manually wound around the cord retainer in the manner previously explained in conjunction with the embodiments of the invention illustrated in FIGS. 1–9. As the cord is wound around the extended retainer 32d, a portion of one of more turns of the cord move into the recess 74d as the cord is wrapped in the groove 34d around the support sections 102 and 104. In addition, the turns of the cord press against the flange 50d. The turns of the cord are held between the plate portion 48d of the cord retainer 32d and the rear side surface 16d which partially defines the recess 74d. As the cord is manually wound around the support sections 102 and 104 of the cord retainer 32d, the cord retainer is stationary relative to the housing 12d.

Case With Cord Retainer

In the embodiment of the cord retainer illustrated in FIGS. 1–11, the cord retainer is connected with the housing 12 for the portable electrical device 10. In the embodiment of the invention illustrated in FIGS. 12 and 13, the cord retainer is connected with a case which at least partially encloses the portable electrical device. Since the embodiment of the invention illustrated in FIGS. 12 and 13 is generally similar to the embodiment of the invention illustrated in FIGS. 1–11, similar numerals will be utilized to designate similar components, the suffix letter "e" being associated with the numerals of 12 and 13 to avoid confusion.

Figure 12:
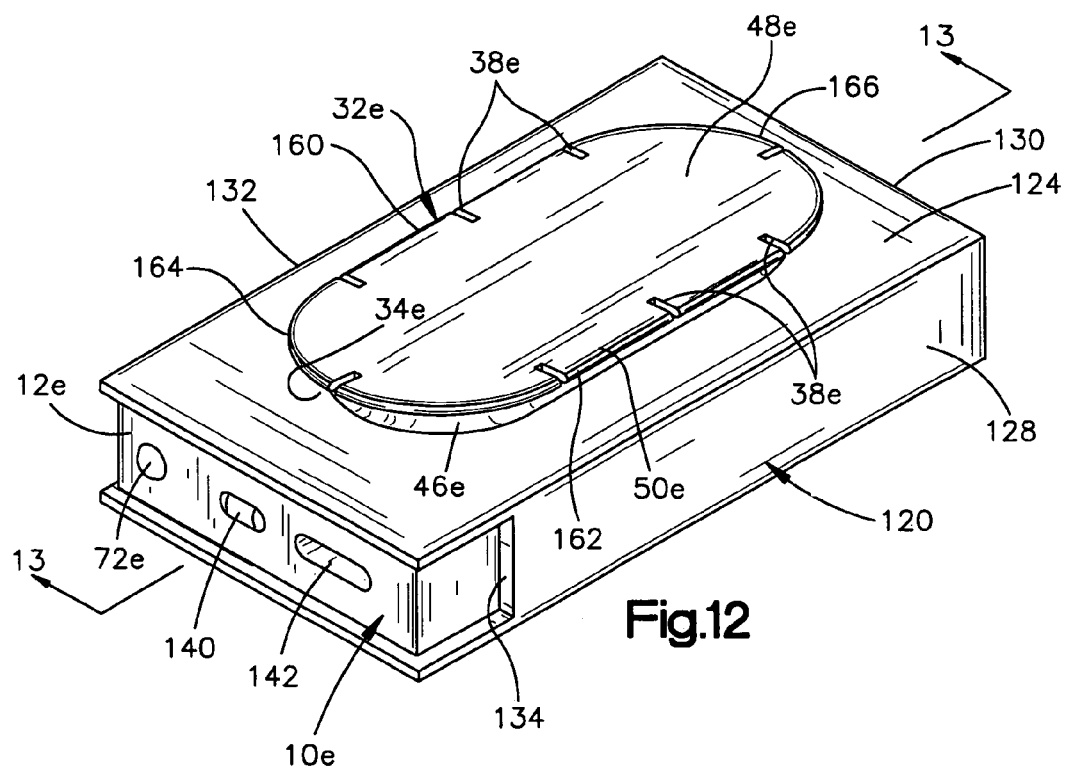
FIG. 12 is a schematic pictorial illustration depicting the manner in which the cord retainer may be connected with a case for a portable electrical device.
Figure 13:
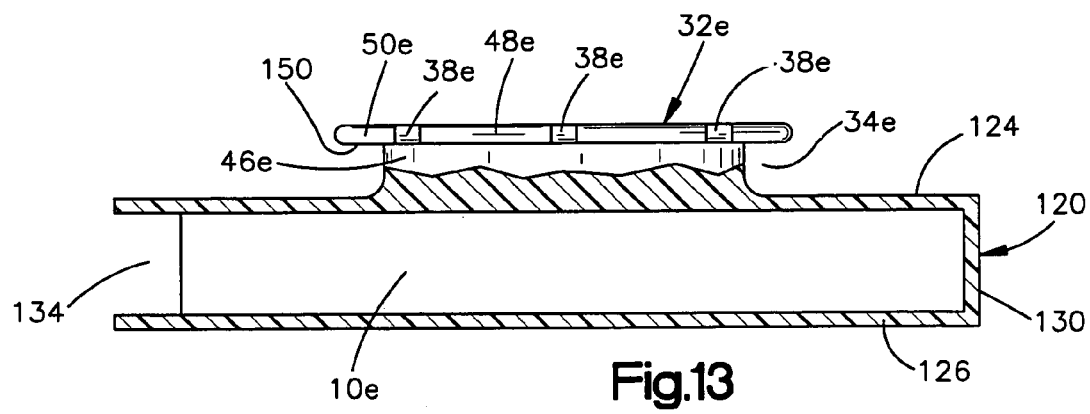
FIG. 13 is a fragmentary schematic sectional view, taken generally along the line 13—13 of FIG. 12, and illustrating the relationship of the cord retainer and case to the portable electrical device, the cord retainer being integrally formed as one piece with the case.

A known portable electrical device 10e is illustrated in FIG. 12 as being enclosed by a case 120. A cord retainer 32e is mounted on an upper major side 124 of the case 120. The cord retainer 32e has the same general construction and function as the cord retainers 32, 32a and 32b of FIGS. 1–8.

In addition to the upper (as viewed in FIG. 12) major side 124, the rectangular case 120 includes a lower major side 126 (FIG. 13) which is connected with the upper major side 124 by a plurality of minor sides 128, 130 and 132. The case 120 has an open end portion 134 which provides access to the electrical device 10e when the electrical device is enclosed by the case 120.

The illustrated case 120 has a generally rectangular configuration which corresponds to the generally rectangular configuration of the electrical device 10e. It should be understood that the electrical device 10e and case 120 may have a different configuration if desired. For example, the electrical device 10e and case 120 may have a generally circular configuration.

The illustrated case 120 is integrally molded as one piece of a polymeric material. The cord retainer 32e is formed of the same polymeric material as the case 120 and is integrally molded as one piece with the case 120. However, if desired, the cord retainer 32e may be formed of a plurality of pieces of polymeric material and/or of another material, such as metal. The illustrated case 120 is flexible. However, the case 120 may be rigid if desired.

The cord retainer 32e at least partially defines a groove 34e (FIG. 13) into which a cord may be manually wound to store the cord. The cord may have any one of many known constructions. For example, the cord may be similar to the cord disclosed in U.S. Patent Application Publication No. 2002/0137554 A1. In the embodiment illustrated in FIGS. 12 and 13, the electrical device 10e is a digital music player. However, the electrical device 10e may be a cellular phone, disc player, radio, or any other known device.

The electrical device 10e has a rigid rectangular housing 12e which is enclosed by the case 120. A portion of the electrical device 10e is exposed at an open end portion 134 of the case 120. A switch 140 (FIG. 12) and light 142 at one end of the electrical device 10e are exposed at the open end portion 134 of the casing 120. In addition, an outlet 72e which is engaged by a jack connected with the cord is exposed at the open end portion 134 of the case 120.

When the cord is to be wound around the cord retainer 32e, the cord is manually grasped and moved into the groove 34e and wound around the outside of the cord retainer. A plurality of turns of the cord are formed in the groove 34e around the cord retainer 32e to at least partially fill the groove with the cord. The cord retainer 32e does not move relative to the case 120 and electrical device 10e as the cord is wound around the cord retainer 32e. The second end of the cord may then be secured by inserting it into any one of a plurality of notches 38e formed in the cord retainer. The stored cord and cord retainer 32e project for a relatively small distance from the case 120 and do not destroy the compact construction and portability of the electrical device 10e.

In the specific embodiment of the cord retainer 32e illustrated in FIGS. 12 and 13, there are eight notches 38e in the cord retainer. However, a greater or lesser number of notches may be provided if desired. For example, either twelve or six notches or recesses, having the same configuration as the notches 38e, may be formed in the cord retainer 32e. By providing a plurality of notches 38e in the cord retainer 32e, a free end portion of the cord is relatively close to a notch into which the cord is to be inserted when the cord has been wound around the cord retainer 32e.

It is contemplated that the notches 38e may be omitted and the cord secured to the cord retainer 32e only by winding the cord in the groove 34e. If desired, the groove 34e may be provided with a partially restricted entrance to retard movement of the cord from the groove. If the notches 38e are omitted, clips may be used to further hold the cord in the groove 34e. These clips may be connected with the cord retainer 32e or may be separate from the cord retainer.

The cord retainer 32e (FIG. 12) has an oval configuration. However, if desired, the cord retainer 32e may have a different configuration, such as the circular configuration. The cord retainer 32e may be constructed so as to have the same general configuration as the electrical device 10e and case 120.

The cord retainer 32e (FIG. 13) is integrally formed as one piece of molded polymeric material. In the embodiment of the invention illustrated in FIGS. 12 and 13, the cord retainer 32e and case 120 are integrally molded as one piece of polymeric material. The one piece cord retainer 32e includes a base portion 46e and a plate portion 48e.

If desired, the base portion 46e and plate portion 48e may be formed separately and interconnected by one or more fasteners. If the base portion 46e and plate portion 48e are formed separately, they may be formed of different materials. The case 120 may be formed of a material which may be different than the material or materials from which the base portion 46e and plate portion 48e are formed.

The base portion 46e and plate portion 48e both have an oval configuration. However, the plate portion 48e extends beyond the base portion 46e to form a flange 50e. As is perhaps best seen in FIG. 13, the flange 50e has an inner side surface 150 which cooperates with the upper major side 124 of the case 120 to form the groove 34e. When a cord is wound in the groove 34e, the cord is held by engagement with the inner side surface 150 of the flange 50e and the major side 124 of the case 120.

Since the plate portion 48e has an oval configuration which corresponds to the oval configuration of the base portion 46e, the flange 50e extends outward from the base portion 46e by substantially the same distance throughout the extent of the flange. This results in the groove 34e having the same depth throughout its extent. Therefore, turns in the cord which are wrapped around the base portion 46e can be firmly gripped between the flange 50e and the upper major side 124 of the case 120 throughout the extent of the groove 34.

The illustrated plate portion 48e has straight parallel edge portions 160 and 162. These straight edge portions 160 and 162 are interconnected by arcuate edge portions 164 and 166. The arcuate edge portions 164 and 166 are formed as semicircles. However, it is contemplated that edge portions may have a different configuration if desired. For example, the straight edge portions 160 and 162 may have an arcuately curving configuration. As another example, the arcuate edge portions 164 and 166 may have a curving arcuate configuration which is different than the configuration of a portion of a circle.

Cord Retainer and Case

Second Embodiment

In the embodiment of the invention illustrated in FIGS. 12 and 13, the cord retainer 32e is integrally formed as one piece with the case 120. In the embodiment of the invention illustrated in FIG. 14 the cord retainer is formed separately from the case. Since the embodiment of the invention illustrated in FIG. 14 is generally similar to the embodiment of the invention illustrated in FIGS. 12 and 13, similar numerals will be utilized to designate similar components, the suffix letter "f" being associated with the numerals of FIG. 14 to avoid confusion.

Figure 14:
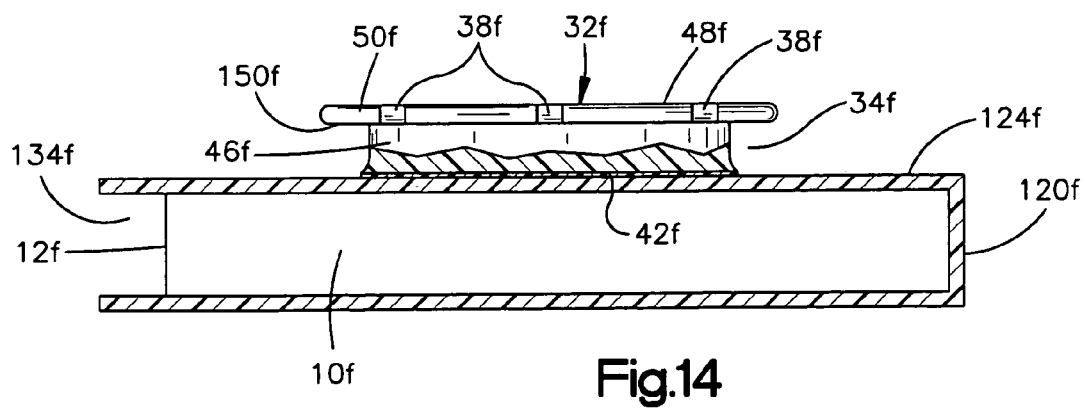
FIG. 14 is a fragmentary schematic sectional view, generally similar to FIG. 13, of an embodiment in which the cord retainer is connected with the case by a fastener.

A known portable electrical device 10f is illustrated in FIG. 14. Although the portable electrical device 10f is a digital music player, it should be understood that the digital music player is representative of many different known types of portable electrical devices. For example, the portable electrical device 10f may be a disc player, cellular phone, or radio.

The electrical device 10f includes a rectangular housing 12f which is enclosed by a rectangular case 120f. The case 120f has the same configuration as the case 120 of FIGS. 12 and 13. The case 120f has an open end portion, 134f, corresponding to the open end portion 134 of FIGS. 12 and 13, through which the electrical device 10f is accessible.

A cord retainer 32f is connected to the case 120f by a releasable fastener 42f. The cord retainer 32f is integrally formed as a single piece of molded polymeric material and has the same general construction as the cord retainer of FIGS. 2–6. However, if desired, the cord retainer 32f may be formed of a plurality of pieces of polymeric material or other materials, such as metal.

The cord retainer 32f and case 120f are formed of the same polymeric material. However, the cord retainer 32f and case 120f may be formed of different materials if desired. For example, the cord retainer 32f may be formed of a polymeric material and the case 120f of leather. As another example, the cord retainer 32f may be formed of a polymeric material and the case 120f formed of metal. Of course both the cord retainer 32f and case 120f may be formed of metal.

The cord retainer 32f at least partially defines a groove 34f into which a cord may be manually wound to store the cord. The cord may have any one of many known constructions. As was previously mentioned, the cord may be similar to the cord as disclosed in U.S. Patent Application Publication No. 2002/0137554 A1. A first end of the cord may be connected to an outlet, corresponding to the outlet 72e of FIG. 12, or inserted into a notch or recess 34f in the cord retainer 32f. Although only three notches 38f are illustrated in FIG. 14, it should be understood that the cord retainer 32f is provided with eight notches in the manner previously disclosed in conjunction with the embodiment of the invention illustrated in FIGS. 12 and 13.

When the cord is to be stored, the cord is manually grasped and wound around the cord retainer 32f. As this occurs, a plurality of turns are formed in the cord around the cord retainer 32f to at least partially fill the groove 34f with the electrical cord. The cord retainer 32f does not move relative to the housing as the cord is wound around the cord retainer. The cord is gripped between the case 120f and cord retainer 32f.

The cord retainer 32*f* is fixedly connected to the case 120*f*. A releasable fastener 42*f* (FIG. 14), specifically "dual lock" (trademark) reclosable fastener, is utilized to fixedly connect the cord retainer 32*f* with the case 120*f*. "Dual lock" (trademark) reclosable fastener is commercially available from Minnesota Mining and Manufacturing Company. The reclosable fastener 42*f* has the same construction as the reclosable fastener 42 of FIG. 11.

Other known types of fasteners may be utilized to fixedly connect the cord retainer 32*f* with the case 120*f*. For example, one or more screws or rivets may be utilized. Alternatively, a single layer of adhesive may be utilized to connect the cod retainer 32*f* with the casing 120*f*. If desired, a hook and loop type fastener, such as "Velcro" (trademark), may be used to fixedly connect the cord retainer 32*f* to the case 120*f*. As still another example, tongue and groove joints may be utilized. Regardless of what type of fastener is used, the cord retainer 32*f* is held in a stationary relationship with the case 120*f* by the fastener 42*f*.

When a releasable fastener, such as "dual lock" (trademark) or "Velcro" (trademark), is utilized to fix the cord retainer 32*f* to the case 120*f*, the cord retainer may be easily disconnected from the case. This enables an individual using the electrical device 10*f* to easily disconnect the cord retainer 32*f* from the case 120*f*. Once the cord retainer 32*f* has been disconnected from the case 120*f*, the use of the releasable fastener 42*f* enables the cord retainer 32*f* to be easily reconnected to the case 120*f*.

The cord retainer 32*f* has an oval configuration. However, if desired, the cord retainer may have a different configuration, such as a circular configuration. It is believed that the illustrated oval configuration of the cord retainer 32*f* may be preferred.

As was previously mentioned, the cord retainer 32*f* has the same general construction as the cord retainer 32 of FIGS. 4–6. The cord retainer 32*f* is integrally formed as one piece of molded polymeric material. However, the cord retainer 32*f* may be formed of a different material, such as metal. The one piece cord retainer 32*f* includes a base portion 46*f* and a plate portion 48*f*. If desired, the base portion 46*f* and plate portion 48*f* may be formed separately and interconnected with one or more fasteners.

The base portion 46*f* and plate portion 48*f* both have an oval configuration. However, the plate portion 48*f* extends beyond the base portion 46*f* to form a flange 50*f*. The flange 50*f* has an inner side surface 150*f* which cooperates with an upper major side 124*f* of the case 120*f* and the base portion 46*f* to form the groove 34*f*.

Since the plate portion 48*f* has an oval configuration which corresponds to the oval configuration of the base portion 46*f*, the flange 50*f* extends outward from the base portion 46*f* by substantially the same distance throughout the extent of the flange. This results in the groove 34*f* having the same depth throughout its length. Therefore, turns of the cord which are wrapped around the base portion 46*f* can be firmly gripped between the flange 50*f* and the upper major side 124*f* of the case 120*f* throughout the extent of the groove 34.

A recess, corresponding to the recess 54 of FIG. 6, may be formed in the base portion 46*f* to receive the releasable fastener 42*f*. The fastener may include a strip of adhesive which bonds or secures to a flat inner side of the recess formed in the base 46*f*. The fastener may have a second or outer strip of adhesive. A removable covering strip may be provided on the second or outer strip of adhesive to prevent it from bonding to objects other than the upper major side 124*f* of the case 120*f*.

Combined Belt Clip and Cord Retainer

In the embodiments of the invention illustrated in FIGS. 1–13, the cord retainer 32 is utilized to hold a cord for a portable electrical device. In the embodiment of the invention illustrated in FIGS. 15 and 16, the cord retainer performs the dual functions of holding a cord for the electrical device and connecting the electrical device with a belt extending around a waist or other portion of a body of a person using the electrical device. Since the embodiment of the invention illustrated in FIGS. 15 and 16 is generally similar to the embodiment of the invention illustrated at FIGS. 1–14, similar numerals will be utilized to designate similar components, the suffix letter "g" being associated with the numerals of 15 and 16 to avoid confusion.

Figure 15:
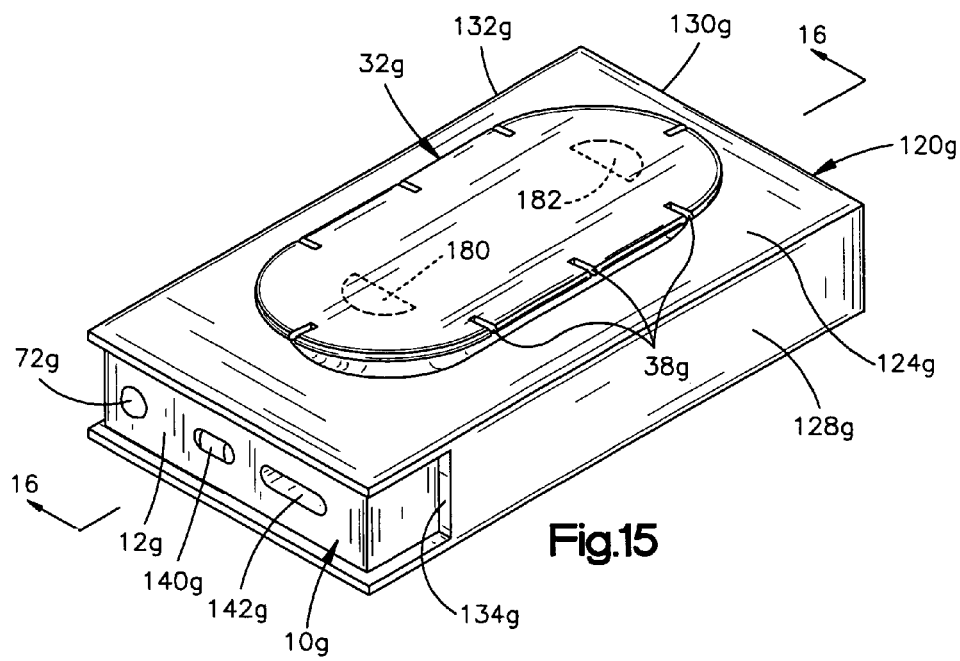
FIG. 15 is a schematic pictorial illustration, similar to FIG. 12, of an embodiment in which the cord retainer functions as a belt clip.
Figure 16:
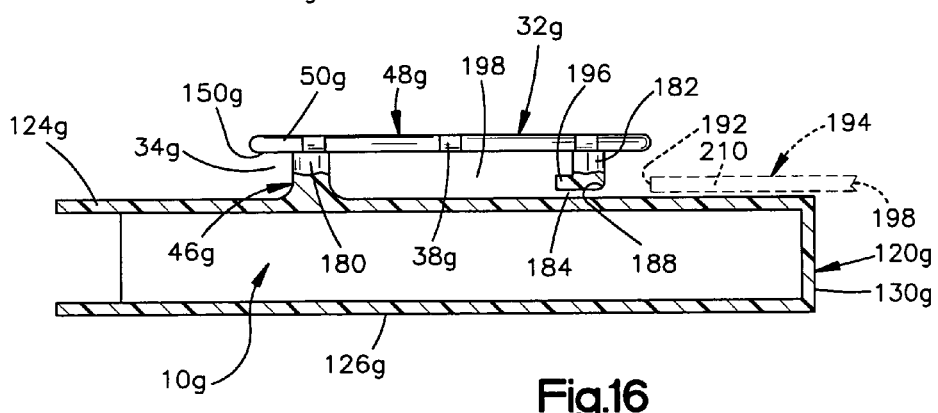
FIG. 16 is a fragmentary sectional view, taken generally along the line 16—16 of FIG. 15, illustrating the manner in which the cord retainer forms a belt clip when used with a case for a portable electrical device.

A known portable electrical device 10*g* is illustrated in FIGS. 15 and 16. Although the portable electrical device 10*g* is a digital music player, it should be understood that the digital music player is representative of many different known types of portable electrical devices. The portable electrical device is enclosed by a case 120*g* (FIG. 15). A cord retainer 32*g* is mounted on an upper major side 124*g* of the rectangular case 120*g*. The cord retainer 32*g* has the same general construction and function as the cord retainers of FIGS. 1 through 14. In addition, the cord retainer 32*g* functions as a belt clip.

In addition to the upper (as viewed in FIG. 15) major side 124*g*, the case 120*g* includes a lower major side 126*g* (FIG. 16) which is connected with the upper major side 124*g* by minor sides 128*g*, 130*g* and 132*g*. The rectangular case 120*g* has an open end portion 134*g* which provides access to the portable electrical device 10*g* when the electrical device is enclosed by the case 120*g*.

The illustrated case 120*g* has a general rectangular configuration which corresponds to the generally rectangular configuration of the electrical device 10*g*. It should be understood that the electrical device 10*g* and case 120*g* may have a different configuration if desired. For example, the electrical device 10*g* and case 120*g* may have a generally circular configuration.

The illustrated case 120*g* is integrally molded as one piece of a polymeric material. The cord retainer 32*g* is formed of the same material as the case 120*g* and is integrally molded as one piece with the case 120*g*. However, if desired, the cord retainer 32*g* may be formed of a plurality of pieces of polymeric material or of another material, such as metal. The illustrated case 120*g* is flexible. However, the case 120*g* may be rigid if desired.

The cord retainer 32*g* at least partially defines a groove 34*g* (FIG. 16) into which a cord may be wound to store the cord. The cord may have any one of many known constructions. In the embodiment of the invention illustrated in FIGS. 15 and 16, the electrical device 10*g* is a digital music player. However, the electrical device 10*g* may be a cellular phone, disc player, radio or any other known device.

The electrical device 10*g* has a rigid rectangular housing 12*g* (FIG. 15) which is enclosed by the case 120*g*. A portion of the electrical device 10*g* is exposed at the open end portion 134*g* of the case 120*g*. A switch 140*g* and a light 142*g* at one end of the electrical device 10*g* are exposed at the open end portion 134*g* of the casing 120*g*. In addition, an outlet 72*g*, which is engaged by a jack connected with a cord, is exposed at the open end portion 134*g* of the case 120*g*.

When the cord is to be wound around the cord retainer 32*g*, the cord is manually grasped and moved into the groove 34*g* and wound around the outside of the cord retainer. A plurality of turns of the cord are formed in the groove 34*g* around the cord retainer 32g to at least partially fill the groove with the electrical cord. The cord retainer 32g does not move relative to the case 120g and electrical device 10g as the cord is wound around the cord retainer. The second end of the cord may then be secured by inserting it into one of a plurality of notches 38g formed in the cord retainer 32g. The stored cord and cord retainer 32g project for a relatively small distance from the case 120g and do not destroy the compact construction and portability of the electrical device 10g.

The cord retainer 32g is integrally molded as one piece of molded polymeric material. In the embodiment of the invention illustrated in FIGS. 15 and 16, the cord retainer 32g and case 120g are integrally molded as one piece of polymeric material. The one piece cord retainer 32g includes a base portion 46g and a plate portion 48g. If desired, the base portion 46g and plate portion 48g may be formed separately and interconnected by suitable fasteners. For example, interlocking grooves or other elements may be utilized.

The base portion 46g and plate portion 48g both have an oval configuration. However, the plate portion 48g extends beyond the base portion 46g to form a flange 50g. The flange 50g has an inner side surface 150g which cooperates with the upper major side 124g of the case 120g to form the groove 34g. When a cord is wound in the groove 34g, the cord is held by engagement with the inner side surface 150g of the flange 50g and the major side 124g of the case 120g.

In accordance with a feature of the embodiment of the invention illustrated in FIGS. 15 and 16, the cord retainer 32g functions as a belt clip to connect the portable electrical device 10g and case 120g with a belt which extends around a waist or other portion of a body of a person using the portable electrical device 10g. To enable the cord retainer 32g to function as a belt clip, the base portion 46g (FIG. 16) is formed in two sections 180 and 182 (FIGS. 15 and 16). The section 180 of the base portion 46g is fixedly connected to the case 120g and to the plate portion 48g. The section 182 of the base portion 46g is fixedly connected to the plate portion 48g.

The section 182 of the base portion 46g is separate from the case 120g. A small slot 184 (FIG. 16) is formed between the section 182 of the base portion 46g and the case 120g. A rounded cam surface 188 is formed on the section 182 of the base.

When an edge portion 192 of a belt 194 is pressed against the cam surface 188, the plate portion 48g of the cord retainer 32g is flexed and the section 182 of the base portion 46g moves away from the case 120 to enlarge the slot 184. This enables the belt 194 to move into a generally rectangular space 198 disposed between the sections 180 and 182 of the base portion 46g. If desired, the section 180 of the base portion 46g may be constructed so as to flex along with the plate portion 48g. If desired, a spring biased hinge may be utilized to allow the plate portion 48g to move relative to the base portion 46g.

Once the belt 194 has moved into the space 198, the natural resilience of the plate portion 48g causes the section 182 of the base portion 46g to spring back toward the case 120g to reduce the size of the slot 184. The edge portion 192 of the belt 194 will then engage the section 180 of the base portion 46g. The weight of the portable electrical device 10g is transferred from the case 120 through the section 180 of the base portion 46g to the belt 194. A flange or lip 196 is provided on the section 182 of the base portion 48g to engage an edge portion 198 of the belt 194.

When the portable electrical device 10g is to be disconnected from the belt 194, the edge portion 192 of the belt 194 is pressed against the section 180 of the base 46g. A lower major side 210 of the belt 194 is pressed against the upper major side 124g of the case 120g. Force is then manually applied to the plate portion 48g to flex the plate portion 48g to move the section 182 of the base away from the upper major side 124g of the case 120g. This increases the size of the slot 184 to enable the belt to be moved through the slot. As this occurs, the case 120g and electrical device 10g are disconnected from the belt 194.

When the section 180 of the base 46g and the plate portion 48g are in the undeflected condition illustrated in FIG. 16, the slot 184 has a thickness, that is, the distance between the upper major side 124g of the case 120g and the section 182 of the base 46g, which is less than the diameter or thickness of a cord to be wound around the cord retainer 32g. Therefore, once the case 120g and cord retainer 32g have been disconnected from the belt 194, the cord can be wound in the groove 34g around the sections 180 and 182 of the base 46g.

Cord Retainer and Fastener

In the embodiment of the invention illustrated in FIGS. 15 and 16, the cord retainer 32g is integrally formed with the case 120g and functions as a belt clip. In the embodiment of the invention illustrated in FIG. 17, the cord retainer is formed separately and is connected directly to the housing 12g of the electrical device 10g. However, the cord retainer may be connected with a case, corresponding to the case 120g of FIGS. 15 and 16 rather than the housing 12g of the electrical device 10g.

Figure 17:
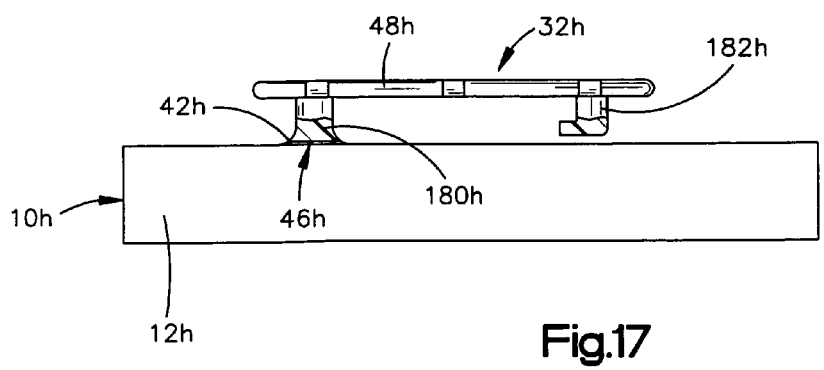
FIG. 17 is a fragmentary sectional view, generally similar to FIG. 16, of illustrating the manner in which the cord retainer forms a belt clip when used with a housing for a portable electrical device.

Since the embodiment of the invention illustrated in FIG. 17 is generally similar to the embodiments of the invention illustrated in FIGS. 1–16, similar numerals will be utilized to identify similar components, the suffix letter "h" being associated with the numerals of FIG. 17 to avoid confusion.

A portable electrical device 10h, specifically, a digital music player, is illustrated schematically in FIG. 17. The portable electrical device 10h has a housing 12h. A cord retainer 32h is connected to the housing 12h by a releasable fastener 42h. The releasable fastener 42h is "dual lock" (trademark) and has the same construction as is illustrated schematically in FIG. 11. The cord retainer 32h functions as a belt clip and has the same general construction as the cord retainer 32g of FIG. 16. However, the section 180h of the base 46h is connected with the housing 12h of the electrical device 10h by the releasable fastener 42h. It should be understood that a case, corresponding to the case 120g of FIG. 16 may be provided in association with the electrical device 10h if desired. If this is done, the releasable fastener 42h would connect the cord retainer 32h to the case rather than to the housing 12h of the electrical device 10h.

The base 46h of the cord retainer 32h is integrally formed as one piece with a plate portion 48h of the cord retainer. However, if desired, the section 180h of the base 46h may be formed separately from the plate portion 48h. For example, the section 180h of the base 46h may be formed of a resiliently deflectable metal which is secured to the plate portion 48h. A section 182h of the base 46h has the same construction as the section 182 of the base 46g of FIG. 16 and is integrally formed as one piece with the flange portion 48h. However, if desired, the section 142h of the base 46h may also be formed of a resiliently deflectable metal and connected with the flange portion 48h.

CONCLUSION

In view of the foregoing description, it is apparent that the present invention relates to a new and improved cord retainer 32 for use with a portable electrical device 10 having a cord. The electrical device 10 may be at least partially enclosed by a case 120. The cord retainer 32 is compact and is effective to store a cord without interfering with carrying and use of the electrical device 10. The cord retainer may have a flange 50 which is connected with a housing 12 of the electrical device 10 or with the case 120 for the electrical device. The flange 50 of the cord retainer at least partially defines a groove 34 into which the cord may be manually wound.

The cord retainer 32 may be fixedly connected with the housing 12 for the portable electrical device 10. When a case 120 is used to enclose at least a portion of the housing 12 for the electrical device 10, the cord retainer 34 may be fixedly connected to the case. The cord retainer 32 may function as a belt clip to connect the electrical device with a belt 194.

The cord retainer 32 may be movable between a retracted position in which the cord retainer is at least partially enclosed by the housing 12 for the portable electrical device 10 and an extended position in which the cord retainer extends outward from the housing (see FIGS. 9 and 10). The cord retainer 32 may have a recess 92 which receives a component 94 of the portable electrical device.

It is contemplated that the cord retainer 32 constructed in accordance with the present invention will be utilized in association with many different types of portable electrical devices. The cord retainer 32 may be particularly advantageous when utilized in association with a cellular phone 10. However, it should be understood that the cord retainer may be utilized in association with other portable electrical devices such as disc players, digital music players, and/or radios.

The invention claimed is:

1. An apparatus comprising a portable electrical device having a housing, a case which at least partially encloses said housing of said portable electrical device, and a cord retainer connected to said case, said cord retainer including a flange which at least partially defines a groove into which a cord may be manually wound, said cord retainer includes a base which is fixedly connected with said case and which has a central axis which extends through said electrical device and through said case, said base and said flange having an oval cross sectional configuration as viewed in a plane extending perpendicular to the central axis of said base, said flange includes first and second parallel portions disposed adjacent to opposite sides of said base and first and second arcuate portions, said first arcuate portion being connected to a first end of said first parallel portion and to a first end of said second parallel portion, said second arcuate portion being connected to a second end of said first parallel portion and to a second end of said second parallel portion.

2. An apparatus as set forth in claim 1 wherein said first and second parallel portions of said flange each have a recess which is engagable with the electrical cord to grip the electrical cord, said first and second arcuate portions of said flange each have a recess which is engagable with the electrical cord to grip the electrical cord.

3. An apparatus comprising a portable electrical device having a housing, a case which at least partially encloses said housing of said portable electrical device, and a cord retainer connected to said case, said cord retainer including a flange which at least partially defines a groove into which a cord may be manually wound, said flange has an inner side surface which faces toward and is spaced from said case, said case having an outer side surface which faces toward said inner side surface of said flange, said outer side surface of said case cooperates with said inner side surface of said flange to further define said groove, at least a portion of a plurality of turns of said cord being disposed in engagement with said outer side surface of said case and said inner side surface of said flange when said cord is wound in said groove.

4. An apparatus as set forth in claim 3 wherein said cord retainer includes a base which is connected with said flange and a reclosable multiple layered fastener connected with said base, said reclosable multiple layered fastener being connected with said case to releasably connect said cord retainer with said case.

5. An apparatus as set forth in claim 3 wherein said cord retainer is integrally formed as one piece with said case.

6. An apparatus as set forth in claim 3 wherein said cord retainer includes a fastener which fixedly secures said cord retainer to one side of said case, a portion of said one side of said case being disposed between said cord retainer and said housing.

7. An apparatus as set forth in claim 3 wherein said flange and said groove have a noncircular configuration.

8. An apparatus as set forth in claim 3 wherein said cord retainer includes a base having a first end portion and a fastener connected with said first end portion of said base and with said case.

9. An apparatus as set forth in claim 3 wherein said cord retainer includes a base having a first end portion which is fixedly connected with said case and a second end portion which is fixedly connected with said flange, said cord retainer has a central axis which extends through said base and said case, said base and flange have oval cross sectional configurations as viewed in a plane extending perpendicular to the central axis of said cord retainer, said case has a surface area which cooperates with said flange to further define the groove into which the cord may be manually wound.

10. An apparatus as set forth in claim 9 wherein said base and flange are integrally formed as one piece.

11. An apparatus as set forth in claim 3 wherein said cord retainer includes a base which is fixedly connected with said case and which has a central axis which extends through said electrical device and through said case.

12. An apparatus as set forth in claim 11 wherein said base and flange are integrally formed as one piece.

13. An apparatus as set forth in claim 11 wherein said base has an oval cross sectional configuration as viewed in a plane extending perpendicular to the central axis of said cord retainer.

14. An apparatus as set forth in claim 3 wherein said flange includes first and second parallel portions and first and second arcuate portions, said first arcuate portion being connected to a first end of said first parallel portion and to a first end of said second parallel portion, said second arcuate portion being connected to a second end of said first parallel portion and to a second end of said second parallel portion.

15. An apparatus as set forth in claim 14 wherein said first and second parallel portions of said flange each have a recess which is engagable with the electrical cord to grip the electrical cord, said first and second arcuate portions of said flange each have a recess which is engagable with the electrical cord to grip the electrical cord.

* * * * *